US007480081B2

(12) United States Patent
Otsuki

(10) Patent No.: US 7,480,081 B2
(45) Date of Patent: Jan. 20, 2009

(54) RECORDING APPARATUS, RECORDING METHOD, RECORDING MEDIUM, COMPUTER-READABLE STORAGE MEDIUM, AND COMPUTER SYSTEM

(75) Inventor: Koichi Otsuki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 897 days.

(21) Appl. No.: 10/642,510

(22) Filed: Aug. 18, 2003

(65) Prior Publication Data

US 2004/0141198 A1 Jul. 22, 2004

(30) Foreign Application Priority Data

Aug. 21, 2002 (JP) ............................. 2002-241018
Aug. 21, 2002 (JP) ............................. 2002-241019

(51) Int. Cl.
*H04N 1/40* (2006.01)

(52) U.S. Cl. ...................................... 358/3.28; 358/468

(58) Field of Classification Search ................ 358/3.28, 358/1.9, 2.1, 468; 399/195, 367, 370–372
See application file for complete search history.

(56) References Cited

U.S. PATENT DOCUMENTS

| | | | |
|---|---|---|---|
| 5,488,223 | A | 1/1996 | Austin et al. |
| 6,101,426 | A | 8/2000 | Kimura et al. |
| 6,386,671 | B1 | 5/2002 | Huston et al. |
| 6,402,405 | B1 | 6/2002 | Frodl et al. |
| 7,008,125 | B2 | 3/2006 | Nunokawa et al. |

FOREIGN PATENT DOCUMENTS

| | | | |
|---|---|---|---|
| EP | 1 080 928 | A | 3/2001 |
| JP | 4-32463 | A | 2/1992 |
| JP | 06-171107 | | 6/1994 |
| JP | 11-049399 | A | 2/1999 |
| WO | WO 02/053389 | A1 | 11/2002 |

*Primary Examiner*—Thomas D Lee
*Assistant Examiner*—Stephen M Brinich
(74) *Attorney, Agent, or Firm*—Sughrue Mion, PLLC

(57) ABSTRACT

A recording method comprises correcting a target carry amount for carrying a recording medium based on information read out from a storage element provided in/on the recording medium or according to a correction amount that is set in accordance with a remaining amount of the recording medium, carrying the recording medium by the corrected target carry amount, and performing recording on the recording medium by ejecting liquid thereon.

13 Claims, 15 Drawing Sheets

| paper remaining amount [mm] | correction amount [μm] |
|---|---|
| 20～18 | 30 |
| 18～16 | 28 |
| 16～14 | 26 |
| 14～12 | 24 |
| 12～10 | 22 |
| 10～8 | 20 |
| 8～6 | 18 |
| 6～4 | 16 |
| 4～2 | 14 |
| 2～0 | 12 |

RECORDING APPARATUS, RECORDING METHOD, RECORDING MEDIUM, COMPUTER-READABLE STORAGE MEDIUM, AND COMPUTER SYSTEM

CROSS-REFERENCE TO RELATED APPLICATIONS

The present application claims priority upon Japanese Patent Application No. 2002-241018 filed Aug. 21, 2002 and Japanese Patent Application No. 2002-241019 filed Aug. 21, 2002, which are herein incorporated by reference.

BACKGROUND OF THE INVENTION

1. Field of the Invention

The present invention relates to a recording apparatus, a recording method, a recording medium, a computer-readable storage medium having a program recorded thereon, and a computer system.

2. Description of the Related Art

Inkjet printers are knows as apparatuses for printing images on various kinds of print media such as paper, cloths, and films. Inkjet printers perform printing by alternately repeating a step of positioning the print medium by making it move in a carry direction with a carry roller etc. and a step of ejecting ink while making nozzles move in a scanning direction.

In order to perform satisfactory printing, it is necessary to carry the print medium accurately. In order to do so, Japanese Patent Application Laid-open Publication No. 11-49399, for example, discloses a carry apparatus that sets, in advance during the manufacturing process, a correction amount for correcting a carry error, corrects the carry amount according to the correction amount that has been set in advance, and carries print sheets by the corrected carry amount.

(1) The carry error of the print medium, however, differs according to the type of print medium mounted on the printer. For example, if the print medium is roll paper, the carry error will differ according to factors such as the roll diameter, the paper quality, and the type of core material. Therefore, in order to improve the precision in carrying the print medium and improve image quality, it is preferable to appropriately correct the carry amount in accordance with the print medium mounted on the printing apparatus.

(2) Further, in printing apparatuses in which a print medium is supplied continuously as with the case of roll papers, the remaining amount of the print medium may have influence on the amount of print medium carried by the carry roller. For example, the diameter of the roll paper, which serves as the print medium, becomes smaller as the roll paper is consumed. As a result, the moment of inertia about the rotation axis of the roll paper gradually changes. This change in the moment of inertia causes the tension applied to the print medium, which is located between the carry roller and the roll paper, to change. The change in the tension results in a change in the amount of slipping between the print medium and the carry roller during carrying of the print medium, and this may cause deterioration in image quality.

SUMMARY OF THE INVENTION

The present invention has been made in view of the circumstances mentioned above, and an object thereof is to improve the precision in carrying a recording medium and thereby improve image quality.

An aspect of the present invention is a recording method comprising: correcting a target carry amount for carrying a recording medium based on information read out from a storage element provided in/on the recording medium; carrying the recording medium by the corrected target carry amount; and performing recording on the recording medium by ejecting liquid thereon.

Another aspect of the present invention is a recording method comprising: correcting a target carry amount for carrying a recording medium according to a correction amount that is set in accordance with a remaining amount of the recording medium; carrying the recording medium by the corrected target carry amount; and performing recording on the recording medium by ejecting liquid thereon.

Features and objects of the present invention other than the above will become clear by reading the description of the present specification with reference to the accompanying drawings.

BRIEF DESCRIPTION OF THE DRAWINGS

In order to facilitate further understanding of the present invention and the advantages thereof, reference is now made to the following description taken in conjunction with the accompanying drawings wherein.

DETAILED DESCRIPTION OF THE INVENTION

Figure 1:
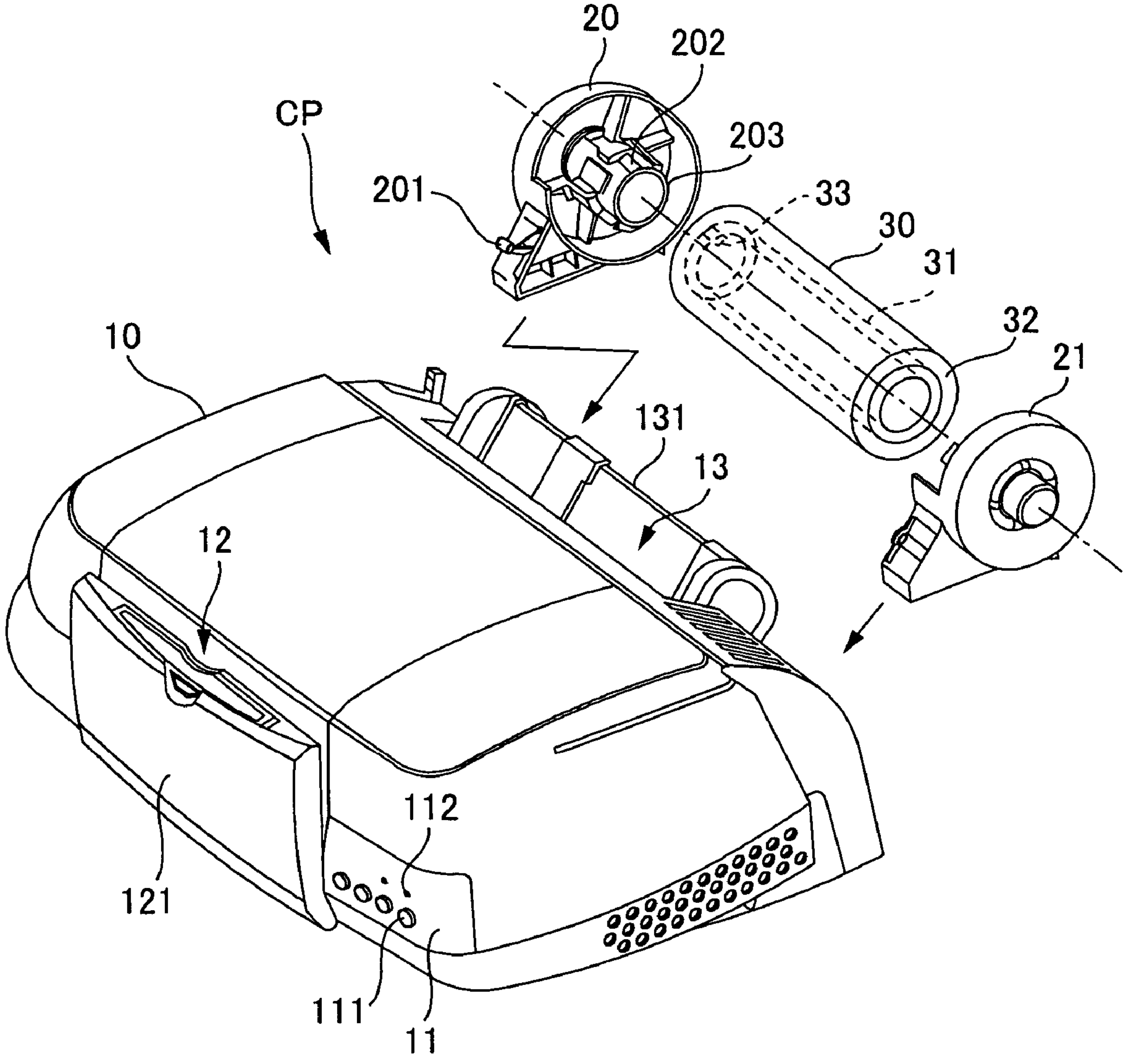
FIG. 1 is a diagram schematically showing the configuration of a printing apparatus according to an embodiment of the present invention.

At least the following matters will be made clear by the explanation in the present specification and the description of the accompanying drawings.

An aspect of the present invention is a recording method comprising: correcting a target carry amount for carrying a recording medium based on information read out from a storage element provided in/on the recording medium; carrying the recording medium by the corrected target carry amount; and performing recording on the recording medium by ejecting liquid thereon.

Since the target carry amount is corrected based on information read out from a storage element provided in/on the recording medium, it becomes possible to appropriately correct the target carry amount in accordance with the recording medium, and therefore, it becomes possible to improve image quality.

Further, it is preferable that the information is a correction amount that is for correcting the target carry amount and that is set in accordance with a remaining amount of the recording medium; and the target carry amount is corrected according to the correction amount that corresponds to the remaining amount of the recording medium.

That is, if the recording medium is, for example, roll paper, the carry amount may change according to the remaining amount of the roll paper. By storing, in the storage element of the recording medium, a correction amount that is set in accordance with a remaining amount of the recording medium and correcting the target carry amount using the correction amount that corresponds to the remaining amount of the recording medium, it becomes possible to improve the precision in carrying the recording medium and thereby improve image quality.

Further, it is preferable that the remaining amount is read out from the storage element provided in/on the recording medium, and that the remaining amount is written using a writing section.

In this way, it becomes possible to manage the remaining amount of the recording medium with the recording medium itself, and therefore, it becomes possible to easily and readily get hold of the remaining amount of the recording medium.

Further, it is preferable that the information is read out by a noncontact-type reading section.

By using a noncontact method, it becomes possible to read/write information from/to the storage element provided in/on the recording medium even when, for example, the relative position between the recording apparatus and the storage element of the recording medium changes. Further, it is possible to prevent wear of components such as the storage element and the sections for reading an writing information with respect to the storage element.

Note that the recording apparatus is, for example, a so-called inkjet printer that performs printing by ejecting ink and making the ink land on the recording medium.

Another aspect of the present invention is a recording method comprising: correcting a target carry amount for carrying a recording medium based on information read out from a storage element provided in/on the recording medium; carrying the recording medium by the corrected target carry amount; and performing printing by ejecting ink on the recording medium and making the ink land thereon, wherein: the information is a correction amount that is for correcting the target carry amount and that is set in accordance with a remaining amount of the recording medium; the target carry amount is corrected according to the correction amount that corresponds to the remaining amount of the recording medium; the remaining amount is read out from the storage element provided in/on the recording medium; the information is read out by a noncontact-type reading section; the recording medium is roll paper; and the method further comprises writing the remaining amount using a writing section.

Accordingly, it becomes possible to improve the precision in carrying a recording medium and thereby improve image quality.

It is also possible realize a recording medium comprising: a storage element for storing information used for correcting a target carry amount for carrying the recording medium, wherein the recording medium is carried by the corrected target carry amount, and recording is performed on the recording medium by ejecting liquid thereon.

It is also possible to realize a computer-readable storage medium having a computer program recorded thereon, the computer program making a recording apparatus that includes a carry mechanism for carrying a recording medium, and is capable of repeating controlling the carry mechanism to carry the recording medium by a target carry amount, and performing recording on the recording medium by ejecting liquid thereon realize a function of correcting the target carry amount based on information read out from a storage element provided in/on the recording medium.

It is also possible to realize a computer system comprising: a computer unit; a display device connected to the computer unit; and a recording apparatus including a carry mechanism for carrying a recording medium, and being capable of: repeating controlling the carry mechanism to carry the recording medium by a target carry amount, and performing recording on the recording medium by ejecting liquid thereon; and correcting the target carry amount based on information read out from a storage element provided in/on the recording medium.

It is also possible to realize a recording apparatus comprising: a carry mechanism for carrying a recording medium, the recording apparatus being capable of: repeating controlling the carry mechanism to carry the recording medium by a target carry amount, and performing recording on the recording medium by ejecting liquid thereon; and correcting the target carry amount based on information read out from a storage element provided in/on the recording medium.

Accordingly, it becomes possible to improve the precision in carrying a recording medium and thereby improve image quality.

Another aspect of the present invention is a recording method comprising: correcting a target carry amount for carrying a recording medium according to a correction amount that is set in accordance with a remaining amount of the recording medium; carrying the recording medium by the corrected target carry amount; and performing recording on the recording medium by ejecting liquid thereon.

Since the target carry amount is corrected according to a correction amount that is set in accordance with a remaining amount of the recording medium, it becomes possible to appropriately correct the target carry amount in accordance with the remaining amount of the recording medium, and therefore, it becomes possible to improve the precision in carrying a recording medium and thereby improve image quality.

Further, it is preferable that the correction amount is provided in accordance with the type of the recording medium.

There are various kinds of recording media that differ, for example, in paper type, paper width, or the type of core material used. If the type of the recording medium is different, the correction amount therefore may also differ. Therefore, by providing the correction amount, which is set according to a remaining amount of the recording medium, in accordance with the type of the recording medium, it becomes possible to optimally correct the target carry amount in accordance with the type of the recording medium, and therefore, it becomes possible to improve the precision in carrying a recording medium and thereby improve image quality.

Further, it is preferable that the correction amount is set in a step-by-step fashion in accordance with a change in the remaining amount of the recording medium.

The change in the amount of slipping of the recording medium with respect to a paper-feed roller is often very small compared to the change in the remaining amount of the recording medium. Therefore, changing the correction amount in a continuous manner with respect to the change in the remaining amount of the recording medium will only lead to an increase in processing load of the recording apparatus, without being able to expect much improvement in image quality. This is why it is preferable to set the correction amount in a step-by-step fashion in accordance with a change in the remaining amount of the recording medium.

Further, if the correction amount is changed in midstream of a period during which a series of printing processes for one set of print data is performed (also referred to as a "period during which a printing process for one job is performed"), defects such as appearance of a discontiguous section in the printed image may arise. Therefore, it is preferable that the target carry amount is corrected according to a same one of the correction amount throughout the period during which a printing process for one job is performed.

Note that the recording apparatus is, for example, an ink-jet printer that performs printing by ejecting ink and making the ink land on the recording medium.

Another aspect of the present invention is a recording method comprising: correcting a target carry amount for carrying a recording medium according to a correction amount that is set in accordance with a remaining amount of the recording medium; carrying the recording medium by the corrected target carry amount; and performing printing by ejecting ink on the recording medium and making the ink land thereon, wherein: the correction amount is provided in accordance with the type of the recording medium; the correction amount is set in a step-by-step fashion in accordance with a change in the remaining amount of the recording medium; the target carry amount is corrected according to a same one of the correction amount throughout a period during which a printing process for one job is performed; the recording medium is roll paper; and the remaining amount is a remaining amount of the roll paper.

Since the target carry amount is corrected according to a correction amount that is set in accordance with a remaining amount of the recording medium, it becomes possible to appropriately correct the target carry amount in accordance with the remaining amount of the recording medium, and therefore, it becomes possible to improve the precision in carrying a recording medium and thereby improve image quality.

It is also possible to realize a computer-readable storage medium having a computer program recorded thereon, the computer program making a recording apparatus that includes a carry mechanism for carrying a recording medium, and is capable of repeating controlling the carry mechanism to carry the recording medium by a target carry amount, and performing recording on the recording medium by ejecting liquid thereon realize a function of correcting the target carry amount according to a correction amount that is set in accordance with a remaining amount of the recording medium.

It is also possible to realize a computer system comprising: a computer unit; a display device connected to the computer unit; and a recording apparatus including a carry mechanism for carrying a recording medium, and being capable of: repeating controlling the carry mechanism to carry the recording medium by a target carry amount, and performing recording on the recording medium by ejecting liquid thereon; and correcting the target carry amount according to a correction amount that is set in accordance with a remaining amount of the recording medium.

It is also possible to realize a computer system in which the computer unit stores a plurality of the correction amounts each being provided for each type of the recording medium, makes a user designate a type of the recording medium, generates a target carry amount through correction using the correction amount corresponding to the type of the recording medium designated by the user, and sends the generated target carry amount to the recording apparatus; and the recording apparatus receives the generated target carry amount.

Accordingly, a user operating the computer unit will be able to set a target carry amount that matches the type of the recording medium.

Another aspect of the present invention is a recording apparatus comprising: a carry mechanism for carrying a recording medium, the recording apparatus being capable of: repeating controlling the carry mechanism to carry the recording medium by a target carry amount, and performing recording on the recording medium by ejecting liquid thereon; and correcting the target carry amount according to a correction amount that is set in accordance with a remaining amount of the recording medium.

Since the target carry amount is corrected according to a correction amount that is set in accordance with a remaining amount of the recording medium, it becomes possible to appropriately correct the target carry amount in accordance with the remaining amount of the recording medium, and therefore, it becomes possible to improve the precision in carrying a recording medium and thereby improve image quality.

Schematic Configuration of Printing Apparatus

First, a schematic configuration of a printing apparatus according an embodiment of an example of a recording apparatus of the present invention will be described with reference to FIG. 1. FIG. 1 is a diagram schematically showing the configuration of a printing apparatus according to the present embodiment.

FIG. 1 shows a color printer CP as an example of a printing apparatus. It should be noted that the color printer CP has a printer unit 10, which serves as an example of a printing apparatus unit, and roll paper 30, which serves as an example of a print medium unit, mounted in a detachable manner on the printer unit 10.

The color printer CP is a printer capable of outputting color images. It is, for example, an inkjet-type printer that forms an image by ejecting color inks of, for example, four colors— cyan (C), magenta (M), yellow (Y), and black (K)—onto a print medium (i.e., a medium to be printed, which is an example of a recording medium) to form dots thereon. Note that, in addition to the four colors described above, it is possible to use light cyan (pale cyan, LC), light magenta (pale magenta, LM), and dark yellow (dim yellow, DY) as the color inks.

As shown in FIG. 1, the color printer CP has a structure in which a print medium such as a print sheet is supplied from behind the printer and discharged from the front. The front surface of the printer unit 10 is provided with an operation panel 11 and a paper discharge section 12. The back surface of the printer unit 10 is provided with a paper supply section 13. The operation panel 11 has various operation buttons 111 and display lamps 112. The paper discharge section 12 is provided with a paper discharge tray 121 that covers the paper discharge opening when it is not in use. The paper supply section 13 is provided with a paper supply holder 131 and roll paper unit holders 20, 21 for holding the roll paper 30.

The roll paper 30 has a core 31, roll paper 32 which is wrapped around the outer periphery of the core 31, and a storage element (element) 33, which serves as storage means, provided on the inner periphery of the core 31. The details of the storage element 33 will be described later.

The roll paper unit holders 20, 21 are arranged on both sides at the back of the printer unit 10 so as to form a pair. In the present embodiment, the roll paper unit holder 20 has: an electrical contact 201 providing a contact with the printer unit 10; and a send/receive section 202 that is electrically connected to the electrical contact 201 and serves to send/receive data to/from the storage element 33 of the roll paper 30. Note that in FIG. 1, in order to show both the contact 201 and the send/receive section 202 provided on the roll paper unit holder 20, the roll paper unit holders 20, 21 are shown in a state detached from the printer unit 10 and the roll paper 30.

Configuration of Storage Element

Figure 2:
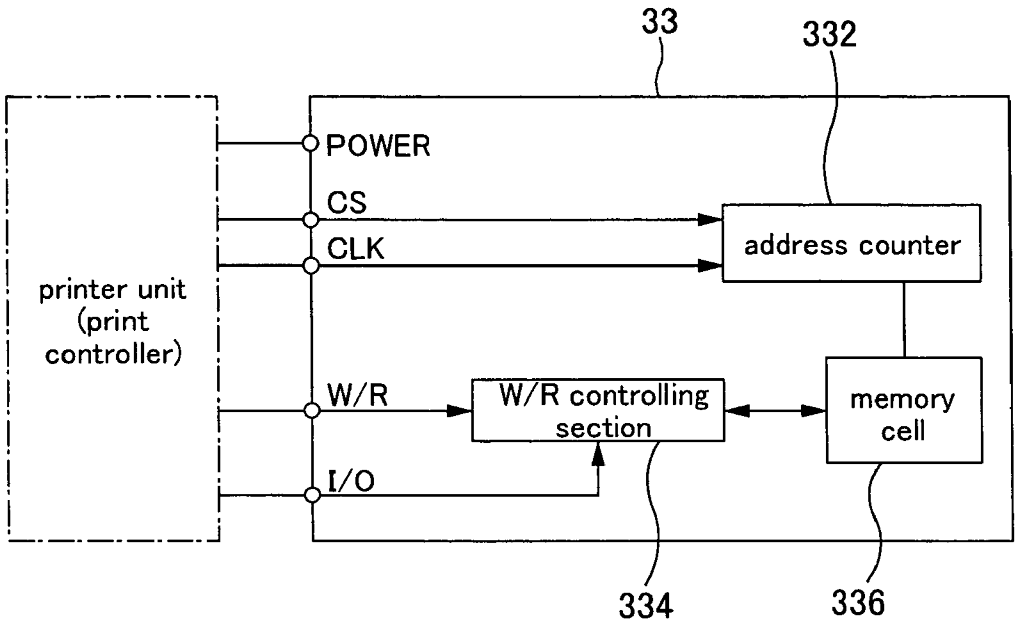
FIG. 2 is a block diagram showing a configuration of a storage element.
Figure 3:
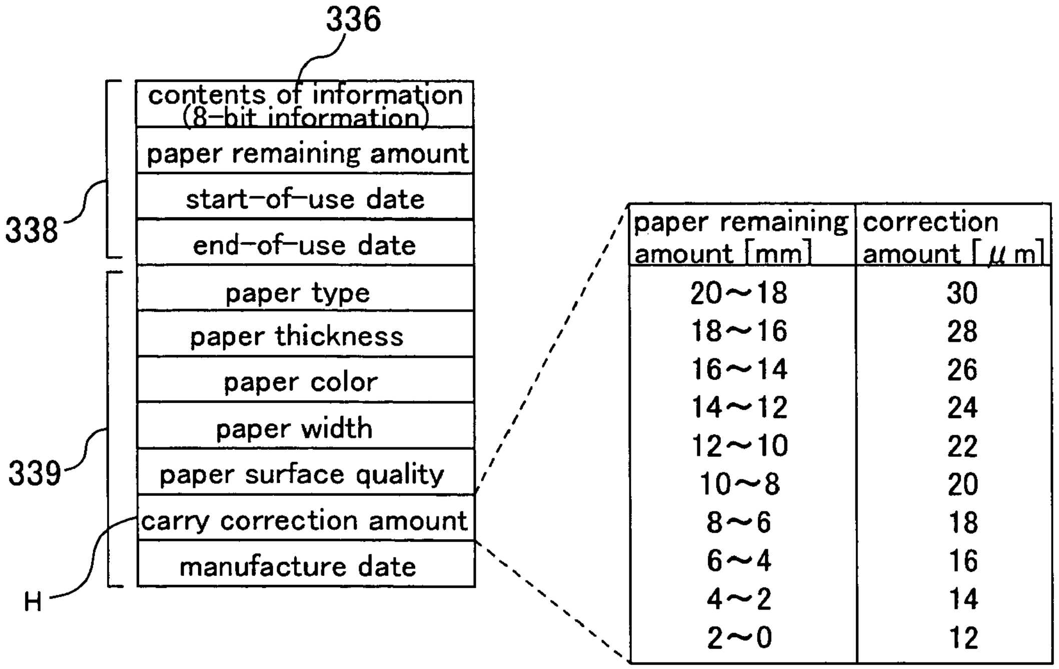
FIG. 3 is a diagram showing a data arrangement in a memory cell provided in the storage element.

Next, with reference to FIG. 2 and FIG. 3, a configuration of the storage element 33 provided on roll paper 30 will be described. FIG. 2 is a block diagram showing the configuration of the storage element 33. FIG. 3 is a diagram showing a data arrangement in a memory cell 336 provided in the storage element 33.

As shown in FIG. 2, the storage element 33 has: the memory cell 336; a W/R controlling section 334 for controlling read/write of data from/to this memory cell 336; and an address counter 332 for designating an address in the memory cell 336 based on a clock signal CLK when reading/writing data with the W/R controlling section 334. Note that reading/writing of data with the W/R controlling section 334 is performed in serial.

As shown in FIG. 3, the memory cell 336 includes: a rewritable region 338 in which data can be read and rewritten; and a non-rewritable region 339 in which data can be read but cannot be rewritten. In the present embodiment, the rewritable region 338 is structured by an EEPROM (Electrically Erasable Programmable Read Only Memory) which is a ROM in which data can be erased and be rewritten electrically. The non-rewritable region 339 is structured by a one-time ROM which is a ROM that can be written in only once.

Data is written into the non-rewritable region 339 before the roll paper 30 is mounted on the printer body 10. For example, data is written in when the roll paper 30 is being manufactured in a factory. Therefore, even though the printer body 10 can perform both read and write of data that is stored in the rewritable region 338, the printer body 10 can only read data in the non-rewritable region 339 and cannot write data therein.

The rewritable region 338 stores information such as paper remaining amount information, start-of-use information, and end-of-use information. The paper remaining amount information indicates the remaining amount of print roll paper 32 of the roll paper 30. The start-of-use information indicates the latest date (e.g., year, month, and day) at which the printer unit 10 started using the roll paper 30 most recently. The end-of-use information indicates the latest date (e.g., year, month, and day) at which the printer unit 10 finished using the roll paper 30 most recently. Note that any kinds of information other than the above can appropriately be stored in the rewritable region 338.

The non-rewritable region 339 stores information such as manufacture date information, paper type information, paper thickness information, paper color information, paper width information, paper surface quality information, and carry correction amount H. The manufacture date information is information about the date on which the print roll paper was manufactured. The paper type information is information about the type of paper (e.g. plain paper, photographic paper). The paper thickness information is information about the thickness of paper. The paper color information is information about the color of the print surface of the paper. The paper width information is about the width of the paper. The paper surface quality information is about the surface quality of the print surface of the paper. The carry correction amount H is a correction amount for correcting a target carry amount (described in detail later) when the printing apparatus carries the print medium upon printing. Details about the carry correction amount H will be described later. Note that any kinds of information other than the above can appropriately be stored in the non-rewritable region 339.

Positional Relationship Between Storage Element and Send/Receive Section

Figure 4:
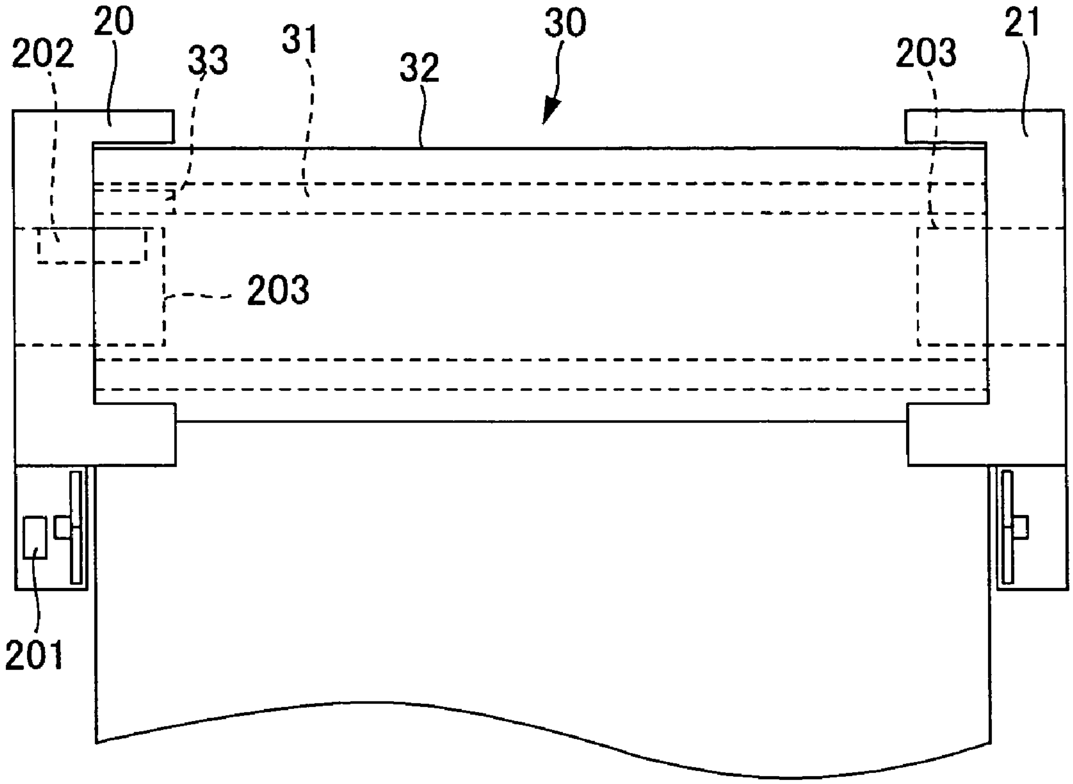
FIG. 4 is a diagram showing a positional relationship between the storage element and a send/receive section in a state where the roll paper is being held by roll paper unit holders.
Figure 5:
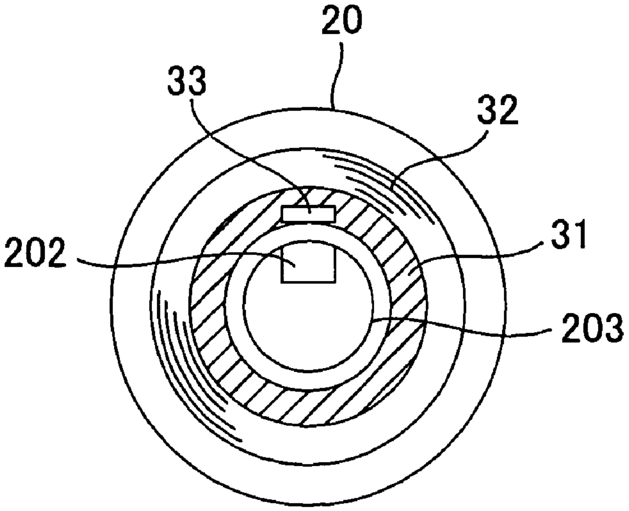
FIG. 5 is a side view of FIG. 4 seen from the side of one of the roll paper unit holders.

Next, with reference to FIG. 4 and FIG. 5, a positional relationship between the storage element 33 of the roll paper 30 and the send/receive section 202 of the roll paper unit holder 20 will be described. FIG. 4 is a diagram showing a positional relationship between the storage element 33 and the send/receive section 202 in a state where the roll paper 30 is being held by the roll paper unit holders 20 and 21. FIG. 5 is a side view of FIG. 4 seen from the side of the roll paper unit holder 20.

In this embodiment, a non-contact-type storage element is used as the storage element 33, and therefore, it is not necessary for the storage element 33 and the send/receive section 202 to come into contact with each other when sending and receiving data. Therefore, as shown in FIG. 4 and FIG. 5, there is a clearance between the send/receive section 202 and the storage element 33. Further, with the non-contact-type storage element, a carrier wave sent from an external send/receive circuit is rectified to generate necessary electric power.

Each time the roll paper 30 rotates once, the storage element 33 of the roll paper 30 comes closest to the send/receive section 202 of the roll paper unit holder 20. When a short-range-type storage element, which is capable of sending/receiving data within a distance of approximately 2 mm, is used as the storage element 33, sending and receiving of data is conducted at a timing in which the storage element 33 and the send/receive section 202 come the closest. Further, when a proximity-type storage element, which is capable of sending/receiving data within a distance of approximately 20 cm, is used, sending and receiving of data is conducted irrelevant to the relative position of the storage element 33 and the send/receive section 202. Note that, it is without saying that a contact-type storage element may be used as the storage element 33. In such a case, the roll paper unit holder 20 will have a contact instead of the send/receive section 202, and data will be sent and received when the roll paper 30 rotates so that the contact of the roll paper unit holder 20 and the contact of the storage element come into contact with each other.

Paper Carry Mechanism

Figure 6:
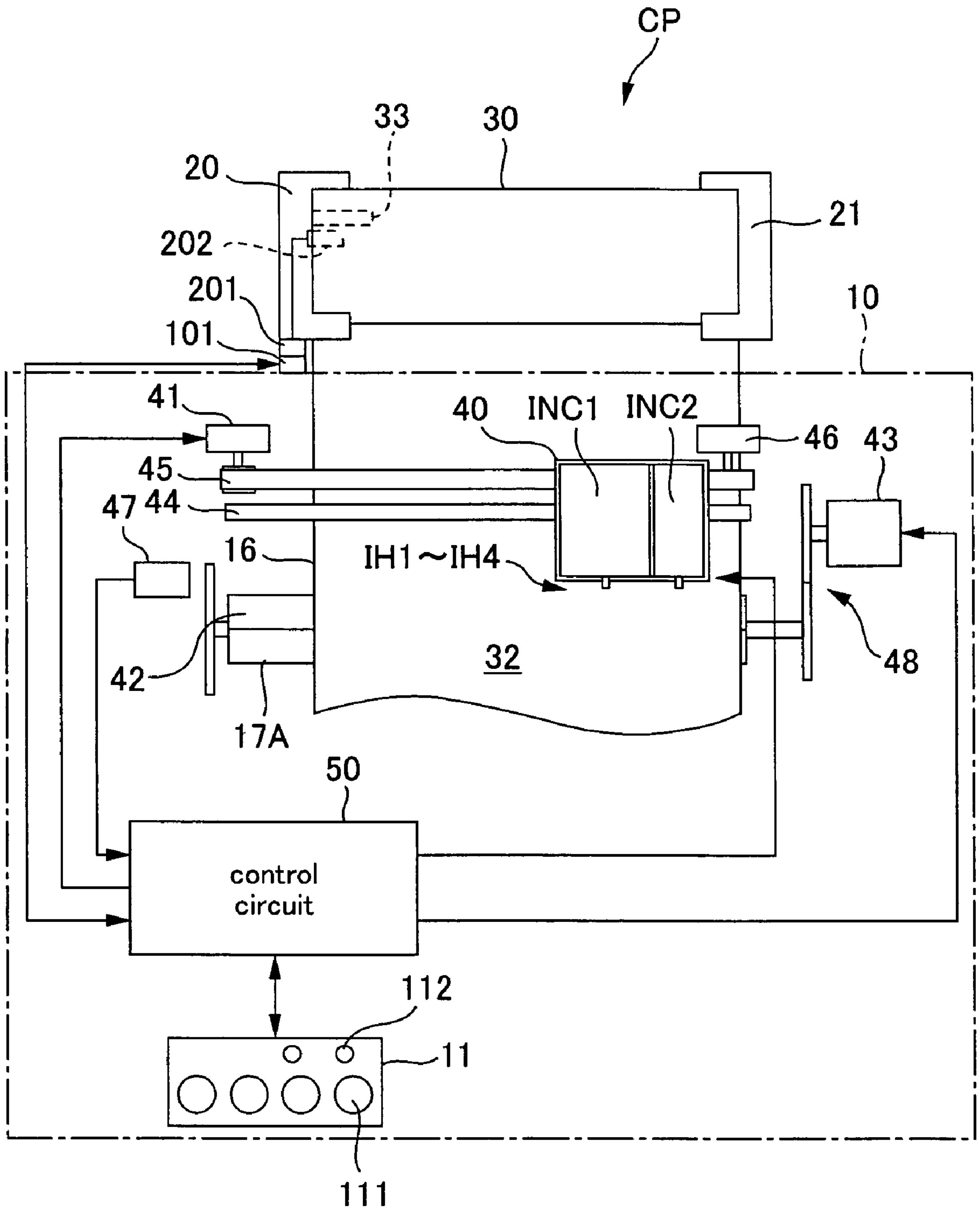
FIG. 6 is a diagram showing the inner configuration of a color printer according to the present embodiment.
Figure 7:
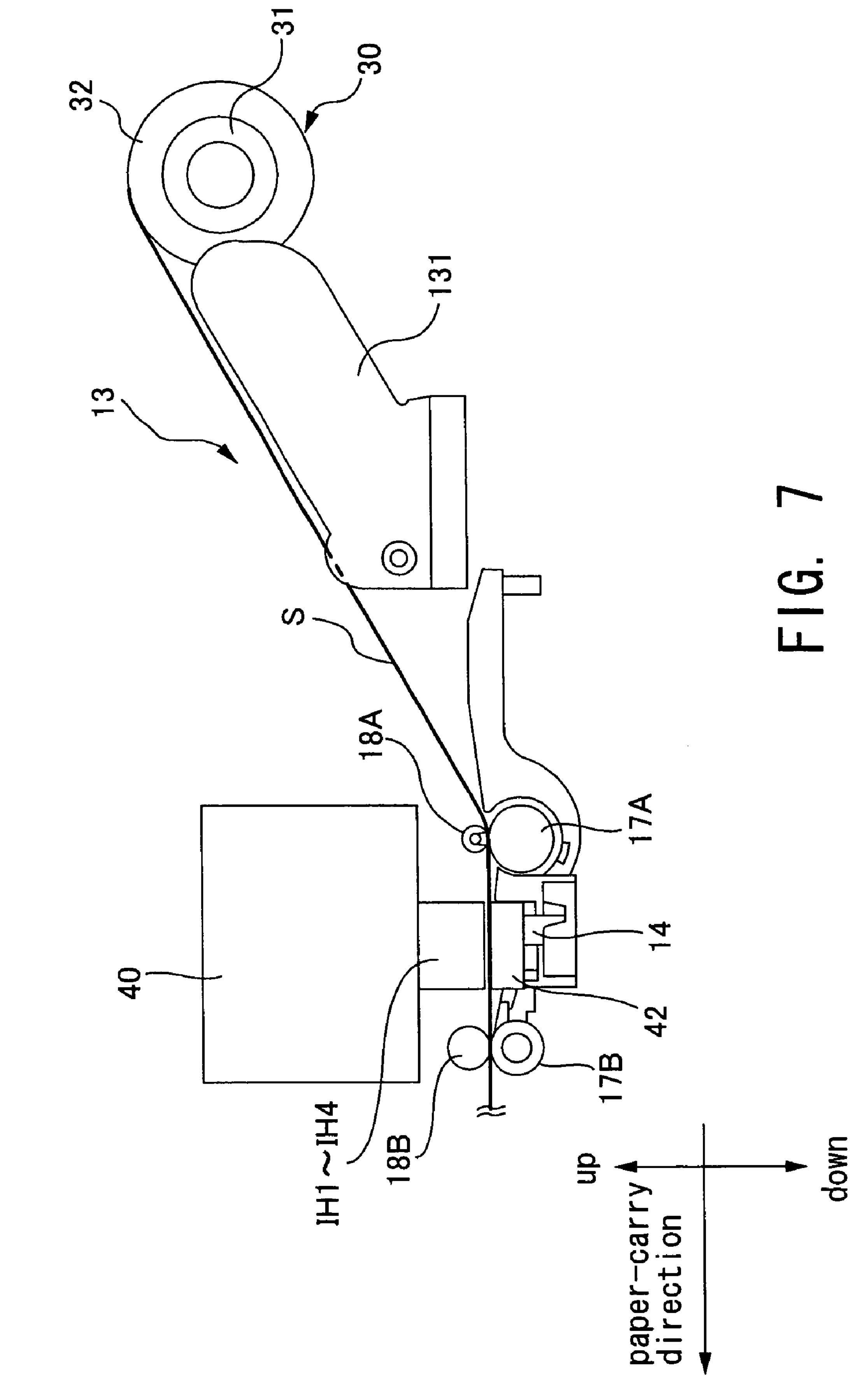
FIG. 7 is a diagram illustrating a carry mechanism of the color printer according to the present embodiment.

Next, with reference to FIG. 6 and FIG. 7, the inner configuration of the color printer CP will be described. FIG. 6 is a diagram showing the inner configuration of the color printer CP according to the present embodiment. FIG. 7 is a diagram illustrating the carry mechanism of the color printer CP.

As shown in the figures, the color printer CP has: a mechanism for performing ink ejection and dot formation by driving print heads IH1 through IH4 mounted on a carriage 40; a mechanism for making the carriage 40 move back and forth in the axial direction of a platen 42 using a carriage motor 41; a mechanism for carrying the print roll paper 32 supplied from the roll paper 30 using a paper feed motor 43; and a control circuit 50.

The mechanism for making the carriage 40 move back and forth in the axial direction of the platen 42 is structured, for example, of: a slide shaft 44 that is bridged over the platen 42 in a direction parallel to the axis of the platen 42 and that slidably holds the carriage 40; and a pulley 46, between which and the carriage motor 41 is stretched an endless drive belt 45.

An ink cartridge INC1 and an ink cartridge INC2 are mounted on the carriage 40. A storage element (memory element) ME for storing information, such as the remaining amount of ink, is provided in/on each ink cartridge INC1, INC2. The ink cartridge INC1 contains black (K) ink, whereas the ink cartridge INC2 contains the other kinds of ink, that is, the inks of the other three colors, cyan (C), magenta (M), and yellow (Y). The ink cartridges may also contain light cyan (LC) ink, light magenta (LM) ink, and dark yellow (DY) ink, as described above.

The carry mechanism for carrying the print roll paper 32 that is supplied from the roll paper 30 includes: the platen 42; the paper-feed motor 43 for making the platen 42 rotate; paper-feed rollers 17A, 17B; a gear mechanism 48 for transmitting the rotation of the paper-feed motor 43 to the platen 42 and a paper supply auxiliary roller; and an encoder 47 for detecting the rotation angle of the platen 42. Also, a contact 101 is provided on the printer unit 10 so as to oppose the contact 201 that is provided on the roll paper unit holder 20.

The control circuit 50 appropriately controls the movement of the paper-feed motor 43, the carriage motor 41, and the print heads IH1 to IH4 while exchanging signals with the operation panel 11 of the printer. Paper S that is pulled out from the print roll paper 32 of the roll paper 30 held by the roll paper unit holders 20, 21 of the color printer CP is pinched between the paper-feed roller 17A a free roller 18A and is carried in the paper-carry direction according to the angle of rotation of the paper-feed roller 17A.

Internal Structure of the Control Circuit

Figure 8:
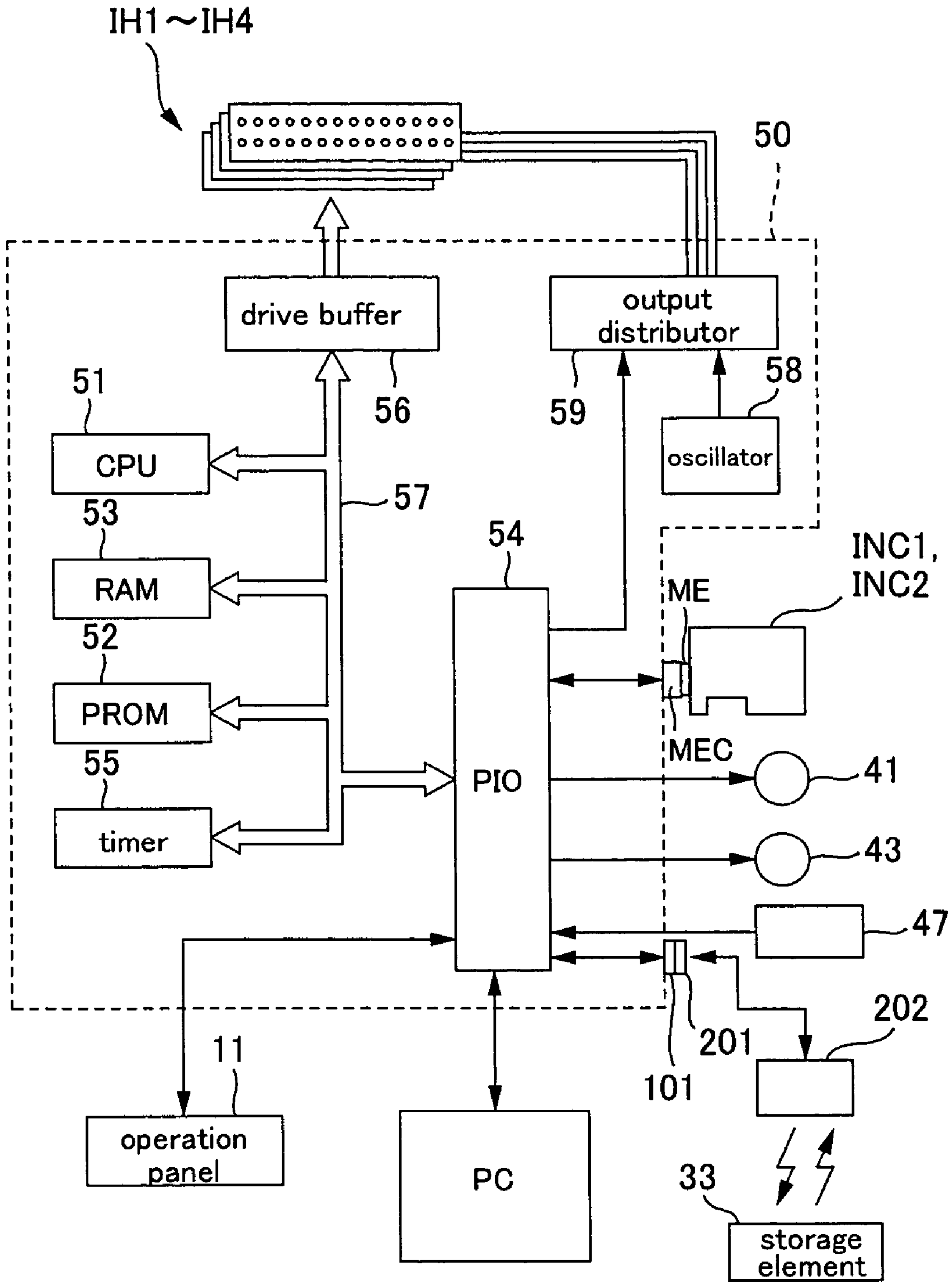
FIG. 8 is a block diagram showing the internal configuration of a control circuit of the color printer according to the present embodiment.

Next, the internal configuration of the control circuit 50 of the color printer CP is described with reference to FIG. 8. FIG. 8 is a block diagram showing the internal configuration of the control circuit 50 of the color printer CP according to the present embodiment.

As shown in the figure, a CPU 51, a PROM 52, a RAM 53, a periphery device input/output section (PIO) 54, a timer 55, and a drive buffer 56, for example, are provided in the control circuit 50.

To the PIO 54 are connected: a personal computer PC; a contact MEC for providing a connection with the storage elements ME of the ink cartridges INC1 and INC2; the carriage motor 41; the paper-feed motor 43; the encoder 47; and the send/receive section 202 via the contacts 101 and 201. The drive buffer 56 is used as a buffer for supplying on/off signals to the print heads IH1 to IH4 for dot formation. These are connected to one another by a bus 57 and can exchange data among one another. The control circuit 50 is also provided with an oscillator 58 for outputting a drive waveform at a predetermined frequency, and an output distributor 59 for distributing the output from the oscillator 58 to the print heads IH1 to IH4 at a predetermined timing.

The control circuit 50 accesses the storage element 33, which is provided on a core material 31 of the roll paper 30, via the send/receive section 202 when, for example, the power is turned on, when the roll paper 30 is exchanged, or when the power is turned off. The control circuit 50 controls the printing process according to the information that is obtained from the storage element 33. The control circuit 50 outputs dot data to the drive buffer 56 at a predetermined timing while synchronizing with the movement of the paper-feed motor 43 and/or the carriage motor 42.

Relationship between Slipping of Paper and Image Quality

Figure 9:
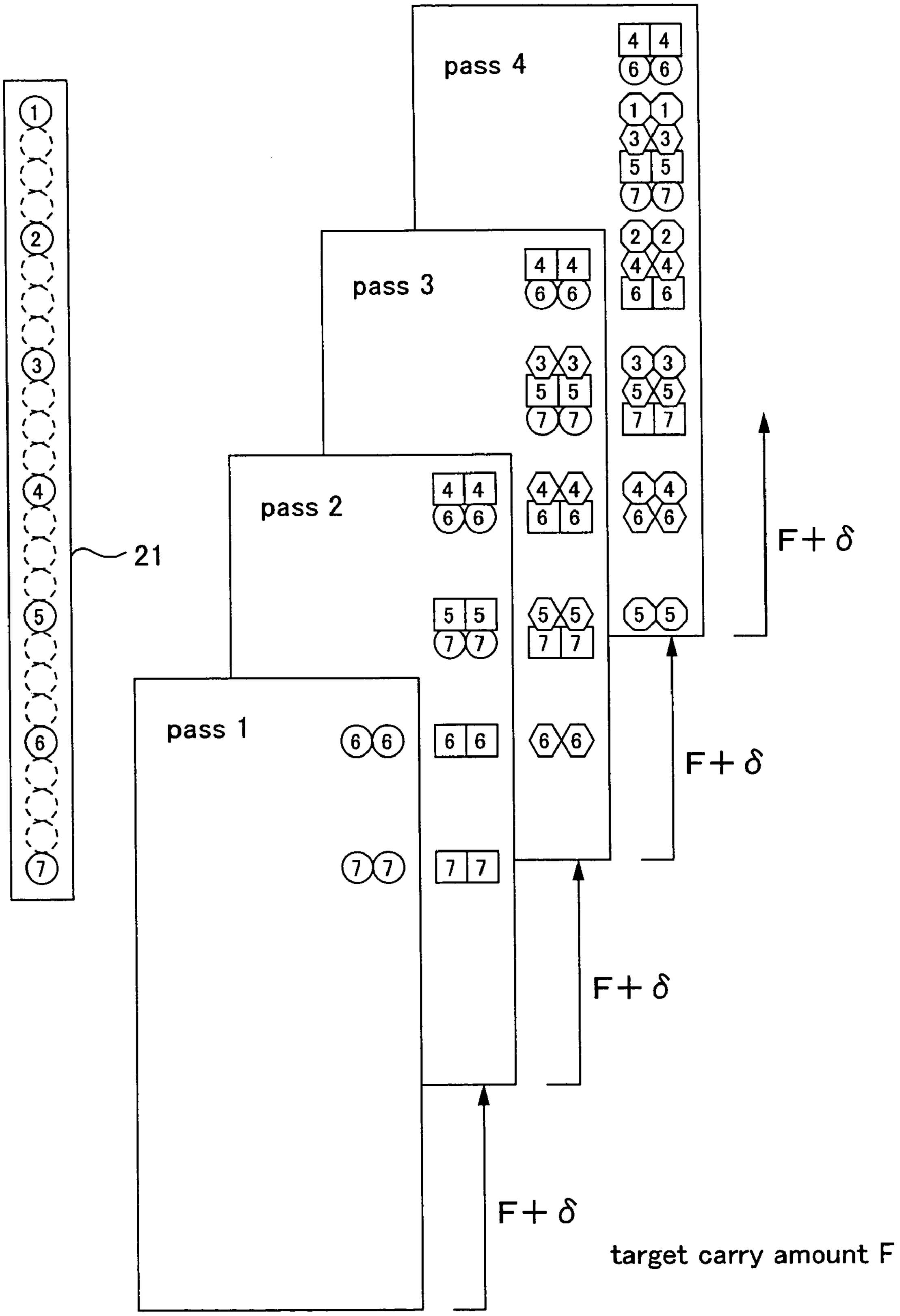
FIG. 9 is a diagram showing how dots are formed in a situation in which the actual carry amount is larger than the target carry amount.
Figure 10:
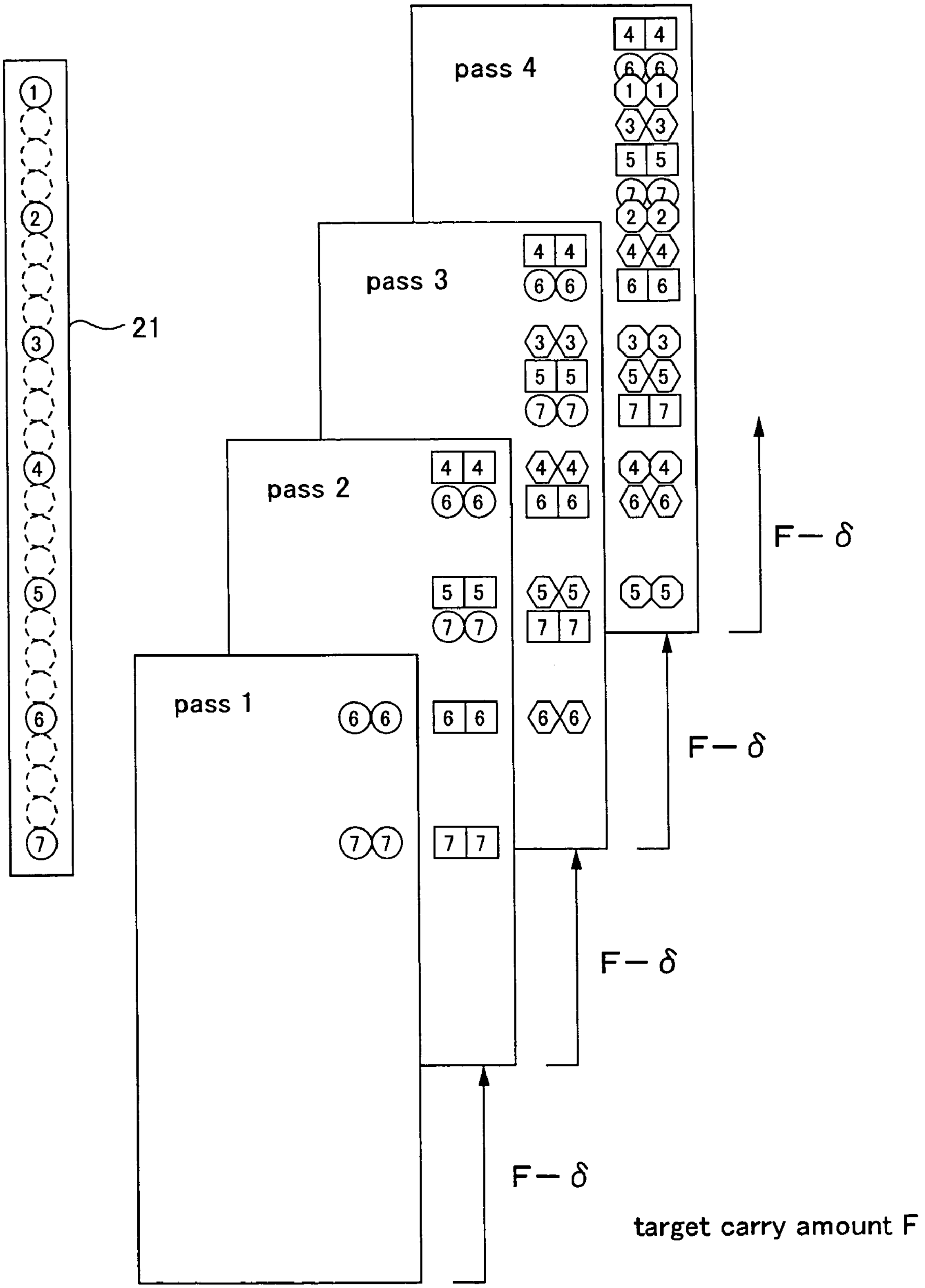
FIG. 10 is a diagram showing how dots are formed in a situation in which the actual carry amount is smaller than the target carry amount.

Next, the relationship between slipping of paper with respect to the paper-feed roller 17A and image quality will be described. FIG. 9 is a diagram showing how dots are formed in a situation in which slipping of paper with respect to the paper-feed roller 17A is small and the actual carry amount is larger than the target carry amount. FIG. 10 is a diagram showing how dots are formed in a situation in which slipping of paper with respect to the paper-feed roller 17A is large and the actual carry amount is smaller than the target carry amount. Note that in order to facilitate explanation, each head IH1 through IH4 is shown to have seven nozzles for one color. Also, note that the numbers 1 through 7 shown in circles indicate the nozzle numbers, and the smaller the number, the further downstream the nozzle is located in the paper-carry direction. The circle marks show the positions of dots (positions of pixels) formed during a first pass; the square marks show the positions of dots formed during a second pass; the hexagon marks show the positions of dots formed during a third pass; and the octagon marks show the positions of dots formed during a fourth pass. Each number in each of these marks indicates the number of the nozzle that ejected the ink for forming that dot.

In FIG. 9 and FIG. 10, two dots are formed during one pass. Actually, however, the nozzles intermittently eject ink while moving in the scanning direction. Therefore, a multitude of dots are formed in a line in the scanning direction. (Such a line is hereinafter referred to as a "raster line".) In the recording method of this embodiment, every time the paper is carried by a carry amount F in the sub-scanning direction, each of the nozzles records a raster line right above the raster line that has been recorded during the immediately-preceding pass.

Figure 11:
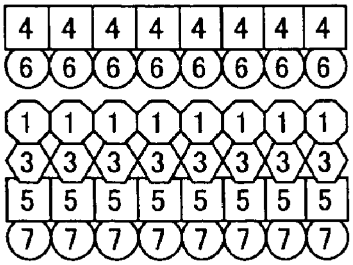
FIG. 11 is an explanatory diagram showing how print stripes (banding) occur in the case of FIG. 9.

In FIG. 9, when the target carry amount is F, the carry unit carries the print medium by a carry amount (F+$\delta$), which includes a constant positive error $\delta$. That is, the print medium is carried downstream in the paper-carry direction by an amount that is greater by the error $\delta$, with respect to the target carry amount F. Such a positive error occurs when, for example, the actual amount of slipping between the paper-feed roller 17A and the print medium is smaller compared to the amount of slipping between the paper-feed roller 17A and the print medium that was expected when setting the target carry amount F. If these errors δ keep accumulating, the dot pitch between the raster lines will become wide, as shown for example in FIG. 11. This causes stripes of light color (called "bright banding", "white banding", "light banding" etc.) that become a cause of deterioration of image quality.

Figure 12:
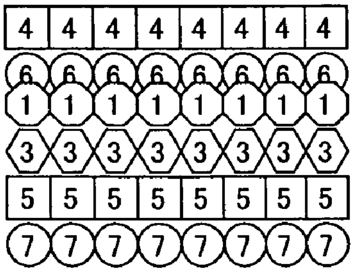
FIG. 12 is an explanatory diagram showing how print stripes (banding) occur in the case of FIG. 10.

In FIG. 10, when the target carry amount is F, the carry unit carries the print medium by a carry amount (F−δ), which includes a constant negative error δ. That is, the print medium is carried downstream in the paper-carry direction by an amount that is smaller by the error 6, with respect to the target carry amount F. Such a negative error occurs when, for example, the actual amount of slipping between the paper-feed roller 17A and the print medium is larger compared to the amount of slipping between the paper-feed roller 17A and the print medium that was expected when setting the target carry amount F. If these errors δ keep accumulating, the dot pitch between the raster lines will become narrow in some sections, as shown for example in FIG. 12. This causes stripes of dark color (called "dark banding", "black banding", "dense banding" etc.) that become a cause of deterioration of image quality.

<Relationship Between Slipping of Paper and Remaining Amount of Paper>

In some situations, the amount of slipping of the print medium with respect to the paper-feed roller 17A depends on the remaining amount (usage amount) of the print medium. For example, if the print medium is print roll paper 32, the amount of slipping of paper S, which is pulled out from the print roll paper 32 and carried by the paper-feed roller 17A, with respect to the paper-feed roller 17A changes in accordance with the amount of the print roll paper 32 remaining in the roll paper 30. In such a case, even when the target carry amount is corrected in advance in consideration of, for example, the quality of the print medium (such as the paper quality of the roll paper), it is not possible to correct the error that occurs due to the change in the remaining amount of the print roll paper 32.

Figure 13:
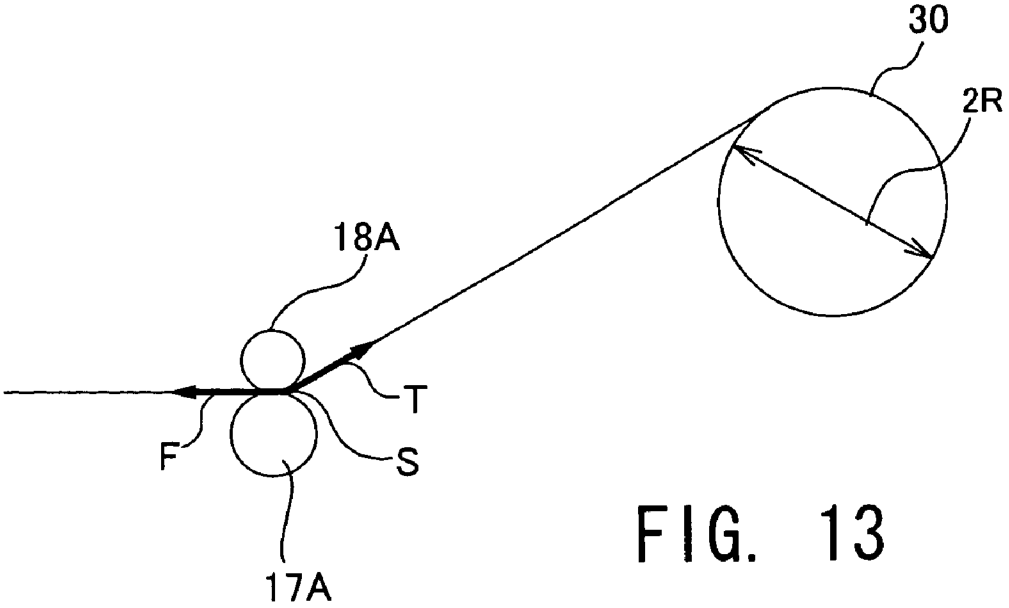
FIG. 13 is a diagram illustrating the principle according to which the amount of slipping of paper with respect to a paper-feed roller changes in accordance with the change in the remaining amount of roll paper.

With reference to FIG. 13, the principle according to which the amount of slipping of the paper S with respect to the paper-feed roller 17A changes in accordance with the change in the remaining amount of the print roll paper 32 will be described below. As shown in FIG. 13, tension T due to the moment of inertia about a rotation axis of the print roll paper 32 is applied to the paper S that is pinched between the paper-feed roller 17A and the free roller 18A and carried thereby. That is, the paper S is pulled in the paper-carry direction when the paper-feed roller 17A pulls the paper S with a force F that is equal to or larger than the tension T. As mentioned above, the tension T is determined in accordance with the moment of inertia about the rotation axis of the print roll paper 32, whereas the moment of inertia changes in accordance with the change in the diameter (2R) of the print roll paper 32. For example, as the diameter 2R of the print roll paper 32 becomes smaller with the consumption of the print roll paper 32, the moment of inertia of the print roll paper 32 also decreases. When the moment of inertia changes in this way, the tension T applied to the paper S will also decrease. This results in a decrease in the amount of slipping of the paper S with respect to the paper-feed roller 17A. This is why the amount of slipping of the paper S with respect to the paper-feed roller 17A changes in accordance with the change in the remaining amount of print roll paper 32.

< Carry Correction Amount >

The color printer CP of the present embodiment is configured to set the target carry amount by also taking into account a variation in the amount of slipping of the paper S with respect to the paper-feed roller 17A caused by the change in the remaining amount of the paper S, as described above. The carry correction amount H as shown in the example of FIG. 3 is the correction amount used for such a correction. In the example of FIG. 3, the carry correction amount H is set in a step-by-step fashion in accordance with the change in the remaining amount of the print roll paper 32. The correction amount is set in this way (i.e., in a step-by-step fashion according to the change in the remaining amount of the print roll paper 32) and not in a continuous manner because the change in the amount of slipping of the paper S with respect to the paper-feed roller 17A is often very small compared to the change in the remaining amount of the print medium, and changing the correction amount in a continuous manner with respect to the change in the remaining amount of the recording medium (i.e., the print medium) will only lead to an increase in processing load of the recording apparatus, without being able to expect much improvement in image quality that meets the increase in the processing load.

The carry correction amount H stored in the storage element 33 is read into a memory inside the color printer CP at an appropriate timing such as when the roll paper 30 is mounted onto the printer. It should be noted that there are various kinds of print roll paper 32 that vary, for example, in paper type (such as plain paper, fine paper, photographic paper, matte paper, drawing paper, glossy paper, OHP sheets, and sticker sheets), paper thickness, and paper width; therefore, the carry correction amount H changes in accordance with the type of roll paper 30. Therefore, the storage element 33 stores a carry correction amount H corresponding to each kind of roll paper 30.

Method of Controlling Carrying

Next, the process in which the print medium is carried by the above-described carry mechanism performed in the color printer CP of the present embodiment will be described in detail.

The CPU 51 of the control circuit 50 sets a target carry amount based on print data input from a computer, such as a personal computer, connected to the color printer CP, and outputs, to the paper feed motor 43, signals for making it rotate by a rotation amount corresponding to the target carry amount. The paper feed motor 43 rotates for the predetermined rotation amount based on the signals sent from the CPU 51, and as a result, the paper-feed roller 17A carries the paper S. The encoder 47 detects the rotation amount of the paper-feed roller 17A and notifies the detection results to the CPU 51.

Figure 14:
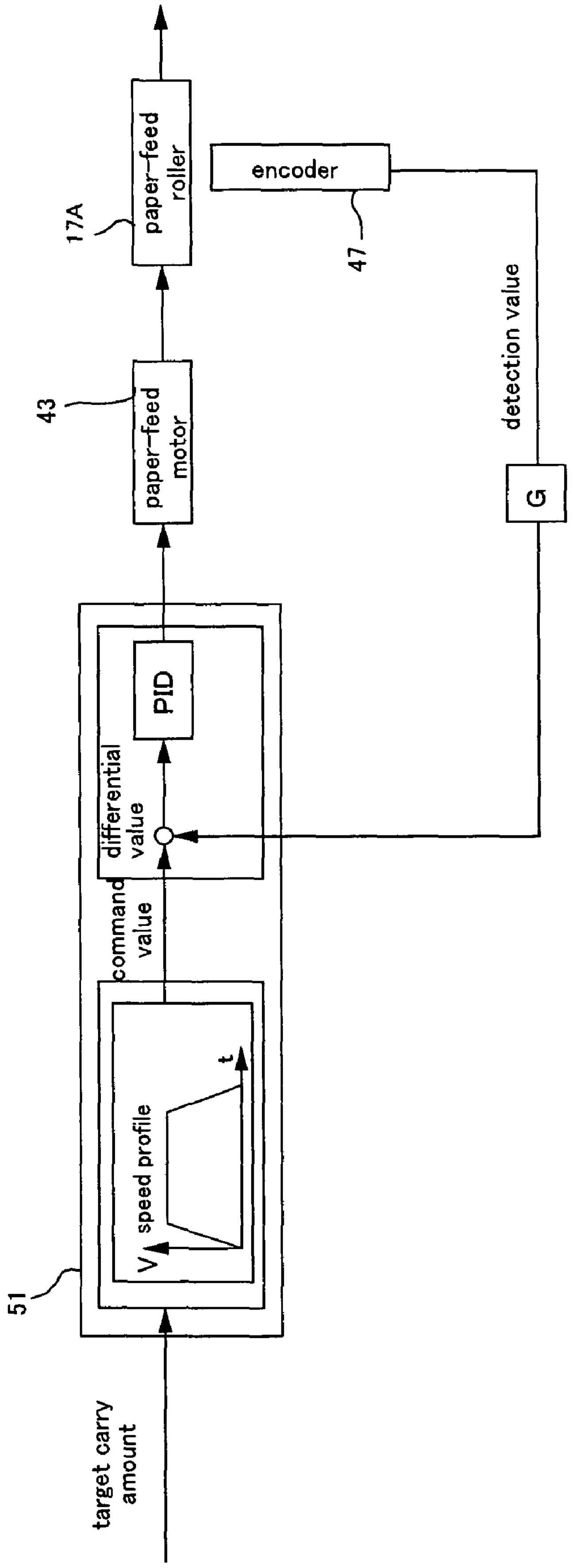
FIG. 14 is a control block diagram illustrating how feedback control of a paper feed motor is performed.

FIG. 14 is a control block diagram illustrating how feedback control of the paper feed motor 43 is performed upon this carrying process. The CPU 51 determines a target rotational speed history (a speed profile) which is to be used by the paper-feed roller 17A. The CPU 51 calculates the target rotational speed history for the paper-feed roller 17A based on information contained in the print data and generates a command value based on the calculated history. The CPU 51, on the other hand, determines a differential value between the generated command value and the detection value sent from the encoder 47 and performs PID control based on the differential value. In this way, feedback control of the paper feed motor 43 is carried out so that the paper is carried according to the target carry amount.

Operation of Color Printer CP

Figure 15:
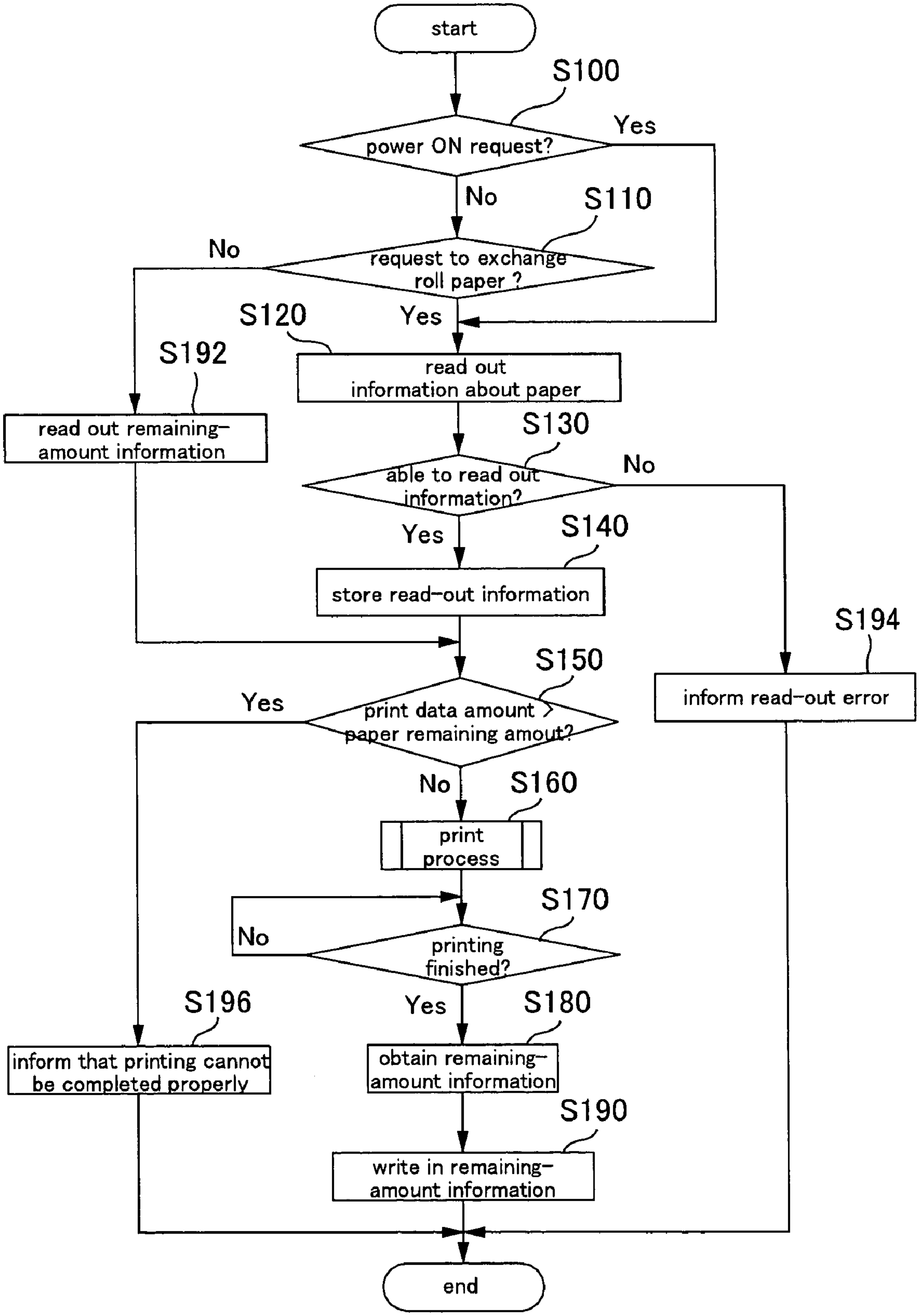
FIG. 15 is a flowchart illustrating a printing process, including sending/receiving of data carried out between the control circuit and the storage element, performed by the color printer during printing.
Figure 16:
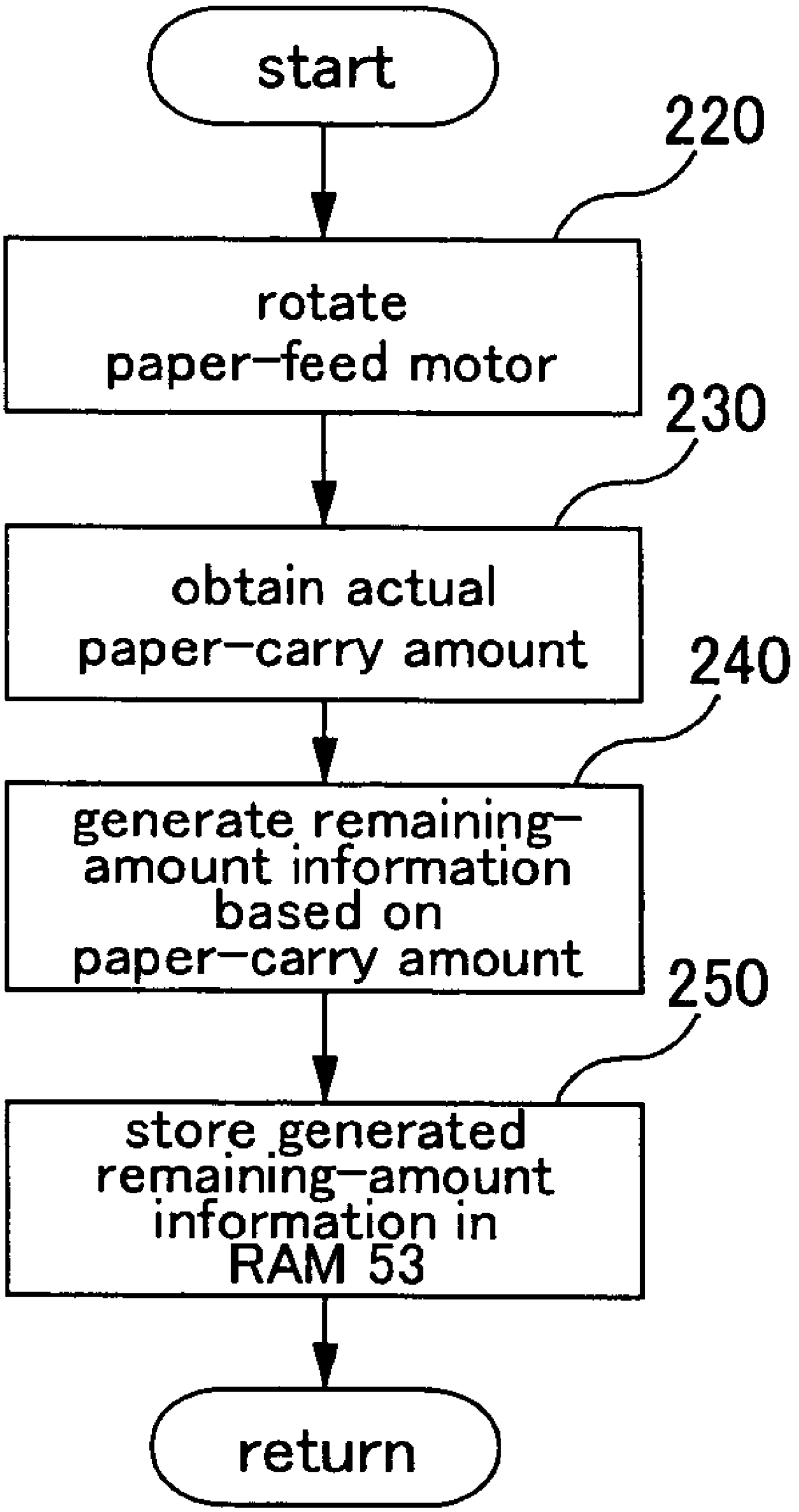
FIG. 16 is a flowchart illustrating a process for rewriting the contents of a RAM.

Next, with reference to FIG. 15 and FIG. 16, the operation of the color printer CP according to the present embodiment will be described. FIG. 15 is a flowchart illustrating a printing process, including sending/receiving of data carried out between the control circuit 50 and the storage element 33, performed by the color printer CP during printing. FIG. 16 is a flowchart illustrating a process for rewriting the contents of the RAM 53.

In FIG. 15, the control circuit 50 first determines whether a power ON request has been issued or not (step S100). That is, the control circuit 50 determines whether or not the color printer CP has started to operate.

If the control circuit 50 determines that a power ON request has not been issued (step S100: No), then the control circuit 50 determines that the color printer CP is currently in operation, and then, it determines whether or not a request to exchange the roll paper 30 has been issued (step S110). The request to exchange the roll paper 30 is issued, for example, when a roll paper exchange button 111 on the operation panel 11 is pressed.

If the control circuit 50 determines that a request to exchange the roll paper 30 has been issued (step S110: Yes), then after the roll paper 30 has been exchanged by the user, the control circuit 50 accesses the storage element 33 of the exchanged roll paper 30 via the send/receive section 202 and reads out information about the paper, which includes the carry correction amount H (step S120).

Note that the control circuit 50 will read out the information about the paper from the storage element 33 also when it determines that a power ON request has been issued at step S100 (step S100: Yes).

If the control circuit 50 is able to read out the information about the paper from the storage element 33 (step S130: Yes), then it temporarily stores the read-out information in the RAM 53 (step S140).

Then, the control circuit 50 executes the printing process (step S160). In the printing process, paper is carried in the manner as described above, and upon carrying the paper, the control circuit 50 corrects the target carry amount according to the carry correction amount H stored in the RAM 53. Specifically, the control circuit 50 performs this correction by outputting, to the paper feed motor 43, a signal corresponding to a carry amount obtained by correcting the target carry amount, which is determined according to the print data, using the carry correction amount H. By controlling the paper feed motor 43 according to the target carry amount has been corrected by the carry correction amount H read out from the storage element 33 of the roll paper 30, the error caused by the change in the amount of slipping of the paper S with respect to the paper-feed roller 17A (which change in the slipping amount being caused in accordance with the change in the remaining amount of the print roll paper 32) is corrected. Accordingly, it is possible to improve image quality.

It should be noted that, for example, upon printing one image, if the carry correction amount H to be used for correcting the target carry amount is changed in midstream of a period during which a series of printing processes for one set of print data sent from a computer connected to the color printer CP is performed (i.e., a period during which a printing process for one job is performed), defects such as appearance of a discontiguous section in the printed image may arise. In view of the above, if such defects become a problem, it is possible to use the same carry correction amount H throughout the period during which a printing process for one job is performed.

Further, since the carry correction amount H is read out from the storage element 33 provided in/on the roll paper 30, it is possible to perform correction using a carry correction amount H that matches the type of roll paper 30. For example, even when a new type of roll paper 30 complying with a new standard is manufactured, it will not be necessary to install and/or set a new carry correction amount H to the color printer CP or a computer connected thereto. Therefore, no burden will be placed on the user.

On the other hand, the contents of the RAM 53 will be rewritten during the printing process. During the printing process, the paper-feed roller 17A is made to rotate in accordance with a paper-carry amount by which the paper is to be carried (step S220). The control circuit 50 obtains the paper-carry amount through detection of the rotation amount of the paper-feed roller 17A by the encoder 47 (step S230). Then, based on the obtained paper-carry amount, the control circuit 50 generates information about the amount of paper remaining after the printing process (step S240). The information about the amount of paper remaining after the printing process that has been generated is stored in the RAM 53 (step S250).

With reference again to FIG. 15, the control circuit 50 waits for the printing to be finished (step S170: No), and when it determines that printing has finished (step S170: Yes), it obtains the information about the remaining amount of paper from the RAM 53 (step S180).

The control circuit 50 accesses the storage element 33 of the roll paper 30 via the send/receive section 202 and writes the obtained remaining-amount information into the storage element 33 (step S190). The present process routine is then ended.

The reason why the information about the remaining amount of paper is written into the storage element 33 of the roll paper 30, and not into a portion of the color printer CP, is because there are such problems as that the roll paper 30 may be exchanged while in use.

If, at step S110, the control circuit 50 determines that a request to exchange the roll paper 30 has not been issued (step S110: No), the updated information about the remaining amount of paper is read out from the storage element 33 (step S192), and the process at step S150 is executed. On the other hand, if, at step S130, the control circuit 50 determines that it is not able to read out the information about the paper from the storage element 33 (step S130: No), such an occurrence of read-out error is informed through, for example, a graphical user interface (GUI) displayed on a display screen of the computer PC or the display lamps 112 on the operation panel 11 (step S194), and the present process routine is then ended.

If, at step S150, the requested print data amount is greater than the remaining amount of paper (step S150: Yes), the control circuit 50 informs the user etc. that printing cannot be completed properly through, for example, the GUI or the display lamps 112 on the operation panel 11 (step S196), and the present process routine is then ended.

Configuration of Computer System Etc.

Next, an embodiment of a computer system, a computer program, and a storage medium having the computer program recorded thereon will be described with reference to the drawings.

Figure 17:
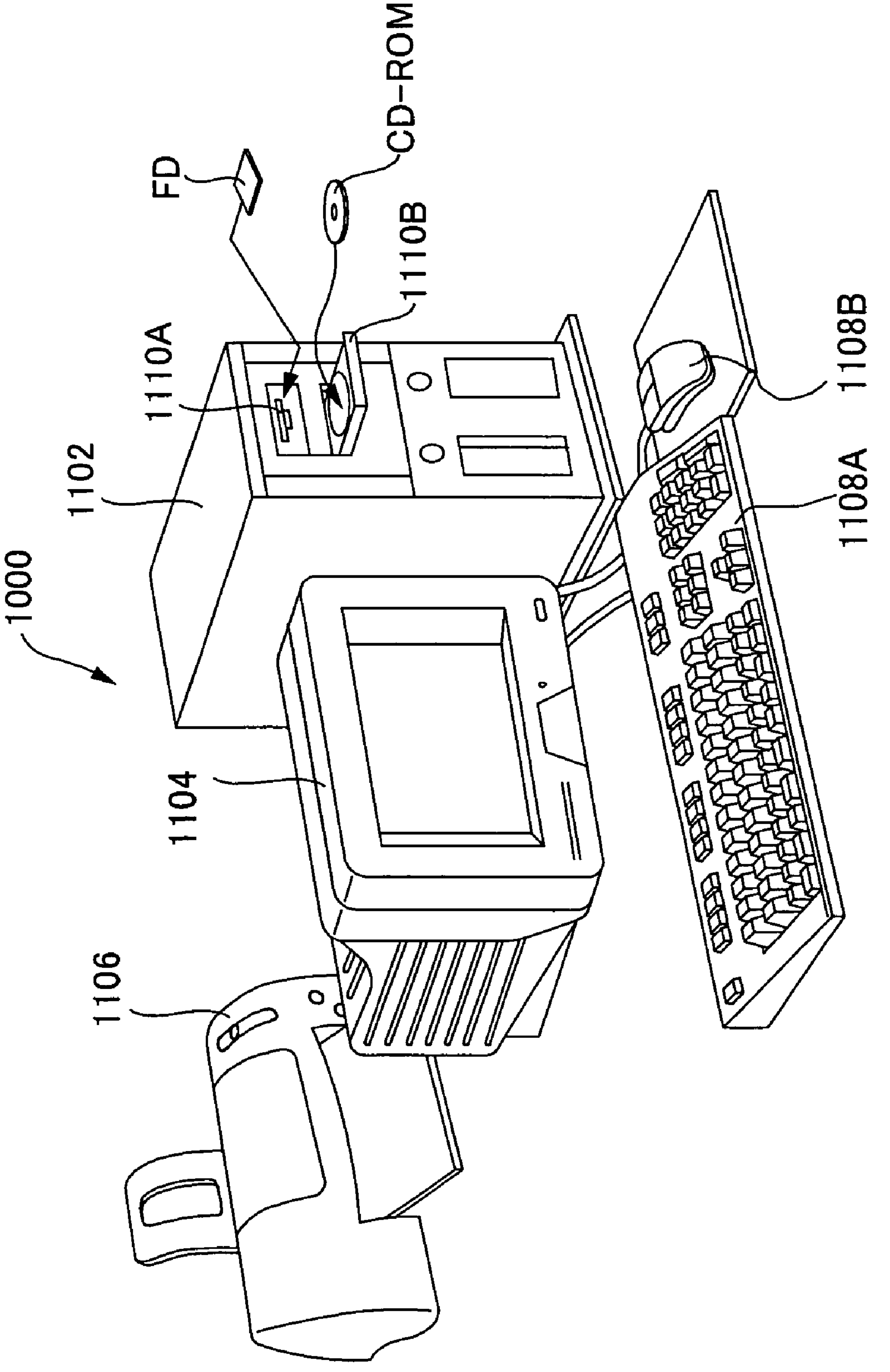
FIG. 17 is an explanatory diagram showing an external configuration of a computer system.

FIG. 17 is an explanatory diagram showing the external configuration of a computer system. The computer system 1000 includes: a computer unit 1102; a display device 1104; a printer 1106; an input device 1108; and a reading device 1110. In the present embodiment, the computer unit 1102 is housed in a mini-tower casing; however the structure is not limited to this example. Although a CRT (cathode ray tube), a plasma display, or a liquid crystal display device is generally used as the display device 1104, any other kinds of devices can be used. The printer described above is used as the printer 1106. In the present embodiment, a keyboard 1108A and a mouse 1108B are used as the input device 1108; however, any other kinds of devices can be used. In the present embodiment, a flexible disk drive device 1110A and a CD-ROM drive device 1110B are used as the reading device 1110; however, it is also possible to use an MO (magneto-optical) disk drive device, a DVD (digital versatile disk) drive, or any other kinds of devices.

Figure 18:
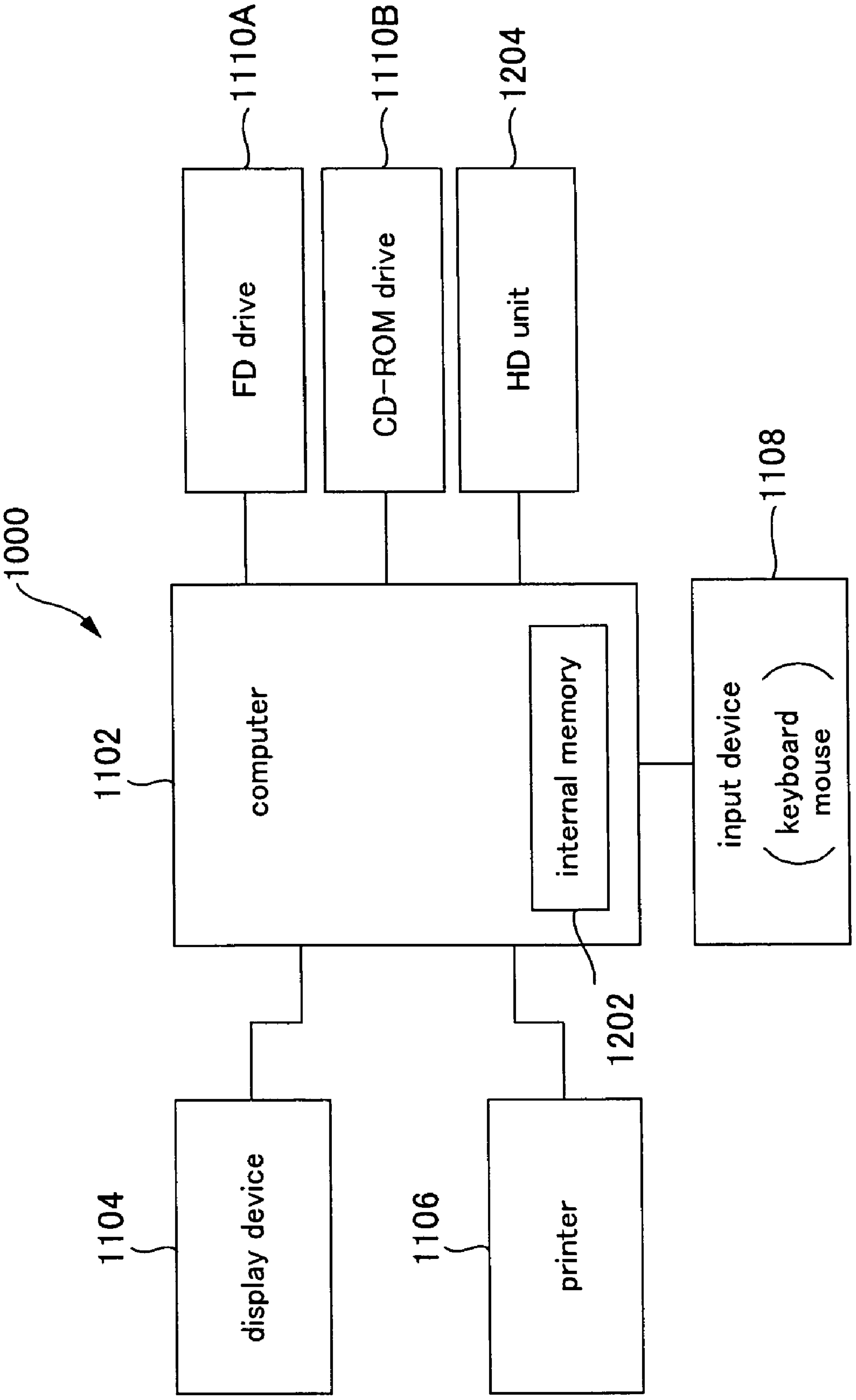
FIG. 18 is a block diagram showing a configuration of the computer system shown in FIG. 17.

FIG. 18 is a block diagram showing the configuration of the computer system shown in FIG. 17. FIG. 18 shows that an internal memory 1202, such as a RAM (random access memory), provided inside the casing in which the computer unit 1102 is housed, and an external memory, such as a hard-disk drive unit 1204, are also provided. A computer program for controlling the operations of the above-described printer is recorded on a storage medium, such as a flexible disk FD and a CD-ROM, and is read by the reading device 1110. The computer program can also be downloaded to the computer system 1000 through a communications line such as the Internet.

In the above, description was made of an example in which the printer 1106 is connected to the computer unit 1102, the display device 1104, the input device 1108, and the reading device 1110 to configure the computer system. However, the configuration is not limited to the above. For example, the computer system may be configured comprising only the computer unit 1102 and the printer 1106, and it does not have to comprise any one of the display device 1104, the input device 1108, and the reading device 1110. Further, for example, it is also possible for the printer 1106 to have some of the functions or mechanisms of each of the computer unit 1102, the display device 1104, the input devices 1108, and the reading device 1110. For example, it is possible to structure the printer 1106 so that it comprises an image processor for image processing, a display section for performing various kinds of displaying, and a recording media mounting section for detachably mounting a recording medium on which image data captured with a digital camera or the like is stored.

Further, in the above-described embodiment, the computer program for controlling the printer can be installed, for example, in a memory of the control circuit 50 of the printer, and the control circuit 50 can execute the computer program to realize the operations of the printer of the embodiment described above.

A computer system configured as above will be superior to existing computer systems as a whole.

Other Embodiments

Above, a recording apparatus etc. according to the present invention were described based on an embodiment thereof. However, the above-mentioned embodiment of the invention is merely for facilitating understanding of the present invention and is not to limit the scope of the present invention. It is without saying that the present invention may be altered and/or modified without departing from the spirit thereof, and that equivalents of the present invention are encompassed within its scope. Particularly, the embodiments described below are included within the scope of the recording apparatus according to the present invention.

In the embodiment described above, the print roll paper 32 was taken as an example. However, the present invention is applicable to cases where print media (recording media) other than the print roll paper 32 are used.

The above-mentioned storage element 33 can be any kind of element as long as it is capable of storing various kinds of information, and can be an element that has various processing sections, arithmetic sections, etc. in addition to the memory cell.

In the example described above, information about the remaining amount of paper is stored in the storage element 33. However, the amount of paper used (for example, how many millimeters (mm) of paper have been used or what percent (%) of paper has been used) can instead be stored in the storage element 33. If the usage amount of paper is known, so would the remaining amount of paper. Therefore, the “remaining amount information” that indicates the remaining amount of the print medium such as paper is a concept that includes not only the remaining amount of paper etc., but also the amount of paper used.

In the embodiment described above, a print paper is taken as an example of the recording medium. However, films, cloths, thin metal sheets, etc. can be used as the recording medium.

In the embodiment described above, a printer dedicated for roll paper is taken as an example of the printing apparatus (recording apparatus). However, it goes without saying that the present invention is applicable to a color printer CP that can use both the roll paper 30 and cut sheets.

In the above-mentioned embodiment, a color printer CP is used as the printing apparatus (recording apparatus). However, the present invention is applicable to, for example, monochrome printers, laser printers, or facsimile machines as long as it is a printing apparatus that can process printing (recording) on roll paper.

In the above-mentioned embodiment, the paper-carry amount is determined based on the rotation angle of the paper feed motor 43 (the platen 42) detected by the encoder 47. However, the paper-carry amount can be calculated based on paper-carry-amount signals sent from the personal computer PC to the color printer CP.

In the above-mentioned embodiment, the remaining amount of paper is calculated from the paper-carry amount determined based on the rotation angle of the paper feed motor 43 (the platen 42) detected by the encoder 47. However, it is possible to, for example, provide a weight sensor WS (not shown) in a casing (not shown) for the roll paper 30 and detect the remaining amount of the print roll paper 32 (or the amount of paper used) based on the weight detected by the weight sensor WS. It is also possible to provide a position sensor PS (not shown) on a side wall of the casing for linearly detecting the height (thickness) of the print roll paper 32 and detect the remaining amount of the print roll paper 32 (or the amount of paper used) based on the height of the print roll paper 32 detected by the position sensor PS. The weight sensor WS and the position sensor PS are realized using known sensors.

In the example described above, the carry correction amount H is read out from the storage element 33 of the print roll paper 32, and the target carry amount is corrected in the color printer CP based on the read-out carry correction amount H. However, it is possible to configure the computer system so that, for example, the carry correction amount H is stored in the computer unit 1102 and the computer unit 1102 notifies the color printer CP of the carry correction amount H. In this case, the system can be configured so that the color printer CP generates the corrected target carry amount, or instead, the computer unit 1102 generates a target carry amount taking into account the carry correction amount H in advance, and sends the target carry amount to the color printer CP. In the latter case, it will be necessary to provide a mechanism so that the computer unit 1102 can obtain the remaining amount of the print roll paper 32. Such a mechanism can easily be realized, for example, by making the color printer CP notify the computer unit 1102 of the remaining amount of the print roll paper 32.

Figure 19:
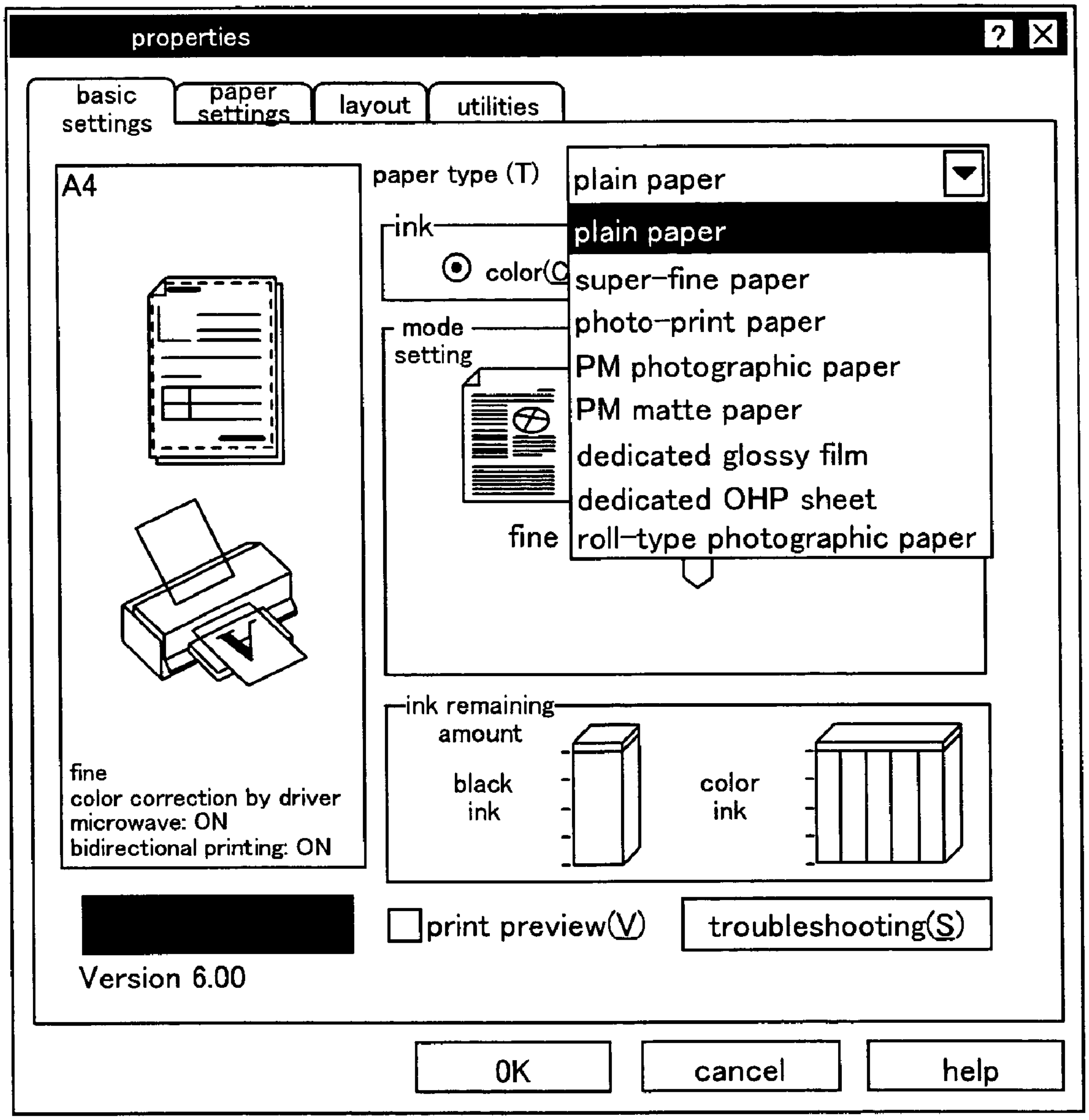
FIG. 19 is a diagram showing an example of a user interface display screen for performing various settings of the printer driver of the color printer that is displayed on a screen of a display device connected to a computer unit.

Further, in case the carry correction amount H is to be stored in the computer unit 1102, it is possible to configure the system so that the carry correction amount H read from the storage element 33 of the roll paper 30 is notified from the color printer CP to the computer unit 1102. Instead, the carry correction amount H can directly be installed to the computer unit 1102 using a storage medium such as a CD-ROM. Note that, in case the carry correction amount H is to be installed to the computer unit 1102 from a storage medium such as a CD-ROM, a mechanism for selecting and applying an appropriate carry correction amount H that matches the type of the roll paper 30 will be necessary. Such a mechanism can easily be realized, for example, by providing a user interface display screen, as shown in FIG. 19, for performing various settings of the printer driver of the color printer CP that is displayed on a screen of the display device connected to the computer unit 1102. More specifically, for example, several carry correction amounts H that are each provided for the different types of recording media can be stored in the computer unit 1102, and when the user selects the type of recording medium through this screen, the target carry amount can be corrected according to the carry correction amount H that corresponds to the recording medium selected by the user.

According to the present invention, it is possible to improve the precision in carrying a recording medium and thereby improve image quality.

What is claimed is:

1. A recording method comprising:

reading out a correction amount from a storage element, said correction amount being for correcting a target carry amount and being set in a step-by-step fashion in accordance with a remaining amount of a recording medium, said storage element being provided in or on said recording medium, said correction amount corresponding to a range of said remaining amount of said recording medium, said remaining amount of said recording medium being obtained based on detection of a rotation amount of a paper-feed roller by an encoder;

correcting said target carry amount for carrying said recording medium according to said correction amount that corresponds to the remaining amount of said recording medium;

carrying said recording medium by said corrected target carry amount; and performing recording on said recording medium by ejecting liquid thereon.

2. A recording method according to claim 1, further comprising writing said remaining amount using a writing section.

3. A recording method according to claim 1, wherein said correction amount is read out by a noncontact-type reading section.

4. A recording method according to claim 1, wherein printing is performed by ejecting ink and making the ink land on said recording medium.

5. A recording method according to claim 1, wherein said recording medium is roll paper.

6. A recording method according to claim 1, wherein said correction amount is provided in accordance with the type of said recording medium.

7. A recording method according to claim 1, wherein said correction amount is set in a step-by-step fashion in accordance with a change in the remaining amount of said recording medium.

8. A recording method according to claim 1, wherein said target carry amount is corrected according to a same one of said correction amount throughout a period during which a printing process for one job is performed.

9. A recording method comprising:

reading out a correction amount from a storage element, said correction amount being for correcting a target carry amount and being set in a step-by-step fashion in accordance with a remaining amount of a recording medium, said storage element being provided in or on said recording medium, said correction amount corresponding to a range of said remaining amount of said recording medium, said remaining amount of said recording medium being obtained based on detection of a rotation amount of a paper-feed roller by an encoder;

correcting said target carry amount for carrying said recording medium according to said correction amount that corresponds to the remaining amount of said recording medium;

carrying said recording medium by said corrected target carry amount; and performing recording on said recording medium by ejecting liquid thereon, wherein:

said remaining amount is read out from said storage element provided in/on said recording medium;

said remaining amount is read out by a noncontact-type reading section;

said recording medium is roll paper; and said method further comprises writing said remaining amount using a writing section.

10. A recording medium comprising:

a storage element provided in or on said recording medium for storing a correction amount used for correcting a target carry amount and that is set in a step-by-step fashion in accordance with a remaining amount of said recording medium, said correction amount corresponding to a range of said remaining amount of said recording medium said remaining amount of said recording medium being obtained based on detection of a rotation amount of a paper-feed roller by an encoder, wherein said recording medium is carried by said corrected target carry amount, and recording is performed on said recording medium by ejecting liquid thereon.

11. A computer-readable storage medium having a computer program recorded thereon, said computer program making a recording apparatus that includes a carry mechanism for carrying a recording medium, and is capable of repeating controlling said carry mechanism to carry said recording medium by a target carry amount, and performing recording on said recording medium by ejecting liquid thereon realize a function of correcting said target carry amount based on a correction amount read out from a storage element provided in/on said recording medium, said correction amount being for correcting said target carry amount and being set in a step-by-step fashion in accordance with a remaining amount of said recording medium, said correction amount corresponding to a range of said remaining amount of said recording medium, said remaining amount of said recording medium being obtained based on detection of a rotation amount of a paper-feed roller by an encoder.

12. A computer system comprising:

a computer unit;

a display device connected to said computer unit; and a recording apparatus including a carry mechanism for carrying a recording medium, and being capable of:

reading out a correction amount from a storage element, said correction amount being for correcting a target carry amount and being set in a step-by-step fashion in accordance with a remaining amount of a recording medium, said storage element being provided in or on said recording medium, said correction amount corresponding to a range of said remaining amount of said recording medium, said remaining amount of said recording medium being obtained based on detection of a rotation amount of a paper-feed roller by an encoder;

correcting said target carry amount for carrying said recording medium according to said correction amount that corresponds to the remaining amount of said recording medium;

making said carry mechanism carry said recording medium by said corrected target carry amount; and performing recording on said recording medium by ejecting liquid thereon.

13. A recording apparatus comprising:

a carry mechanism for carrying a recording medium, said recording apparatus being capable of:

reading out a correction amount from a storage element, said correction amount being for correcting a target carry amount and being set in a step-by-step fashion in accordance with a remaining amount of a recording medium, said storage element being provided in or on said recording medium, said remaining amount of said recording medium being obtained based on detection of a rotation amount of a paper-feed roller by an encoder;

correcting said target carry amount for carrying said recording medium according to said correction amount that corresponds to the remaining amount of said recording medium;

making said carry mechanism carry said recording medium by said corrected target carry amount; and performing recording on said recording medium by ejecting liquid thereon.

* * * * *